(12) United States Patent
Hippalgaonkar et al.

(10) Patent No.: US 9,945,300 B2
(45) Date of Patent: Apr. 17, 2018

(54) TRANSMISSION INPUT TORQUE MANAGEMENT

(71) Applicant: Ford Global Technologies, LLC, Dearborn, MI (US)

(72) Inventors: Rohit Hippalgaonkar, Livonia, MI (US); Joseph F. Kucharski, Livonia, MI (US); Yuji Fujii, Ann Arbor, MI (US); Gregory Michael Pietron, Canton, MI (US); Jason Meyer, Canton, MI (US); Eric Hongtei Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 514 days.

(21) Appl. No.: 14/668,056

(22) Filed: Mar. 25, 2015

(65) Prior Publication Data

US 2016/0281616 A1    Sep. 29, 2016

(51) Int. Cl.
| F02D 29/02 | (2006.01) |
| F16H 63/50 | (2006.01) |
| F16H 61/12 | (2010.01) |
| F16H 59/42 | (2006.01) |
| F16H 59/14 | (2006.01) |

(52) U.S. Cl.
CPC ........... *F02D 29/02* (2013.01); *F16H 63/502* (2013.01); *F02D 2200/1004* (2013.01); *F16H 59/42* (2013.01); *F16H 2059/148* (2013.01); *F16H 2061/124* (2013.01); *F16H 2063/508* (2013.01)

(58) Field of Classification Search
CPC ............. F02D 29/02; F02D 2200/1004; F16H 63/502; F16H 2059/148; F16H 59/42; F16H 2063/508; F16H 2061/124
See application file for complete search history.

(56) References Cited

U.S. PATENT DOCUMENTS

| 7,145,442 | B1 | 12/2006 | Wai | |
| 7,644,812 | B2 | 1/2010 | Simpson et al. | |
| 8,255,130 | B2 | 8/2012 | Fujii et al. | |
| 8,510,003 | B2 | 8/2013 | Yanakiev et al. | |
| 8,706,369 | B2 | 4/2014 | Yanakiev et al. | |
| 2009/0029826 | A1* | 1/2009 | Eguchi | B60T 7/02 477/39 |
| 2013/0066528 | A1* | 3/2013 | Kresse | B60W 10/06 701/54 |
| 2013/0179019 | A1* | 7/2013 | Morimoto | B60W 10/06 701/22 |

(Continued)

OTHER PUBLICATIONS http://www.fev.com_fileadmin_user_upload_Media_EngineeringServices_CalibrationMethods_186_TecInfo_TOPexpert_Trace_Transmission_Calibration_Expert.pdf, 1 page.

(Continued)

*Primary Examiner* — David J Hlavka
(74) *Attorney, Agent, or Firm* — James Dottavio; Brooks Kushman P.C.

(57) ABSTRACT

A method of operating a vehicle includes measuring a transmission output torque, measuring impeller and turbine speeds, estimating a transmission component torque, and adjusting an engine torque to avoid overstressing a transmission component such as a gear. The method does not rely on an accurate estimate of engine torque. Furthermore, the method does not rely on a fixed transmission torque rating in each gear ratio.

8 Claims, 4 Drawing Sheets

(56) References Cited

U.S. PATENT DOCUMENTS

| | | | |
|---|---|---|---|
| 2013/0345022 A1 | 12/2013 | Yanakiev et al. | |
| 2015/0149060 A1* | 5/2015 | Baur | F02D 29/02 701/102 |
| 2015/0149061 A1* | 5/2015 | Baur | F02D 29/02 701/102 |
| 2015/0149065 A1* | 5/2015 | Baur | F02D 29/02 701/110 |

OTHER PUBLICATIONS www.testing-expo.com_usa_08conf_pdfs_day_1_12_AVL_Gianluca%20Vitale.pdf, 17 pages.

* cited by examiner

TRANSMISSION INPUT TORQUE MANAGEMENT

TECHNICAL FIELD

This disclosure relates to the field of vehicle controls. More particularly, the disclosure pertains to a method of mitigating transmission component damage based on component torque estimation.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

A common type of automatic transmission includes a gearbox capable of alternately establishing a fixed number of power flow paths, each associated with a fixed speed ratio. The gearbox includes a number of shift elements such as clutches and brakes. A particular power flow path is established by engaging a particular subset of the shift elements. To shift from one power flow path to another power flow path with a different speed ratio, one or more shift elements must be released while one or more other shift elements must be engaged. Some shift elements are passive devices such as one way clutches, while other shift elements engage or disengage in response to commands from a controller. For example, in many automatic transmissions, the shift devices are hydraulically controlled friction clutches or brakes. The controller regulates the torque capacity of the shift element by regulating an electrical current to a solenoid, which adjusts a force on a valve which, in turn, adjusts a pressure in a hydraulic circuit.

Most transmissions are equipped with a launch device. When the vehicle is stationary or moving very slowly, the gearbox input speed is less than the minimum operating speed of the engine. A launch device transmits torque from the engine to the gearbox input while permitting the engine to rotate at an acceptable speed. A common launch device is a torque converter which includes an impeller driven by the engine and a turbine driving the gearbox input. Torque is transferred from the impeller to the turbine hydro-dynamically. Many torque converters also include a hydraulically controlled lock-up clutch that couples the impeller to the turbine, bypassing the hydro-dynamic power transfer path to improve efficiency at higher vehicle speeds. Other transmissions use an actively controlled launch clutch as a launch device.

A modern automatic transmission is controlled by a microprocessor which adjusts the torque capacity of each shift element, including any lock-up clutch, at regular intervals. At each interval, the controller gathers information indicating the driver's intent, such as the positions of the shifter (PRNDL), the accelerator pedal, and the brake pedal. The controller also gathers information about the current operating state of the vehicle, such as speed, and of the engine. Increasingly, information is also available from other sources, such as anti-lock brake controllers and GPS systems. Using this information, the controller determines whether to maintain the currently established power flow path or to shift to a different power flow path. If the controller decides to shift to a different power flow path, the controller then adjusts the torque capacities of the off-going shift elements and the on-coming shift elements in a coordinated manner in order to make the transition as smooth as possible.

The controller also adjusts the torque produced by the engine by commanding throttle position, spark timing, fuel flow rate, etc. In some vehicles, a single microprocessor may control both the engine and the transmission. In other vehicles, the engine and transmission may be controlled by separate microprocessors communicating with one another via a Controller Area Network (CAN). When separate controllers are utilized, the engine controller normally determines the desired torque level based on the accelerator pedal position, engine speed, and vehicle speed. However, the transmission controller may, in certain circumstances, request that the engine controller command a different torque level. For example, during the inertia phase of a shift, a transmission controller may request an engine torque reduction.

SUMMARY OF THE DISCLOSURE

A method of operating a transmission during a drive cycle includes repeatedly measuring transmission output torque and transmission input speed, repeatedly estimating a transmission component torque, and adjusting an engine torque in response to the estimated component torque approaching a predetermined limit value. The component torque may also be based on a measurement of turbine speed and on the derivatives of transmission input speed and turbine speed. The method may be programmed into a transmission controller. When operating at a given engine speed, in a given gear ratio with a torque converter open, the method adjusts a throttle position to maintain the component torque at the limit value. Different environmental conditions, such as different temperatures may cause an engine torque estimate to differ while the component torque remains constant.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Controlling a hydraulically actuated automatic transmission requires manipulating a number of pressure commands to achieve a desired result. The desired result may be, for example, an upshift or downshift with particular torque and speed characteristics as a function of time. For an upshift, for example, the desired result may be a torque transfer phase that takes a specified amount of time, followed by a specified speed ratio vs. time profile during the inertia phase. In open loop control, the controller uses a model of the transmission to calculate what pressure commands will produce the desired result and then commands those pressure values. The model may be an empirical model based on testing a representative transmission or may be derived from physical laws and nominal transmission characteristics such as dimension. However, the actual behavior of the transmission may differ from the model for several reasons. First, there are part to part variations among transmissions of the same design. Second, a particular transmission varies over time due to gradual wear or unusual events. Third, the transmission responds to a large number of environmental factors such as temperature, atmospheric pressure, etc.

To improve control in the presence of these variations, called noise factors, a controller may utilize closed loop control. Closed loop control improves the result within a particular event, such as a shift. In closed loop control, the controller measures the property that defines the desired behavior, such as speed ratio. The difference between the measured value and a target value is called the error. The commanded pressure is set to the open loop term plus one or more closed loop terms. A proportional term (p term) is proportional to the error, a derivative term (d term) is proportional to the derivative of the error, and an integral term (i term) is proportional to an integral of the error. Each closed loop term has a coefficient of proportionality. These coefficients are set during calibration such that, despite the presence of noise factors, the result converges rapidly toward the desired behavior with minimal oscillation.

Adaptive control improves the result over a number of events. After an event, the controller utilizes the measurements made during the event to revise the model. (Sometimes this is done implicitly rather than explicitly, such as by modifying the open loop terms.) As the model becomes more representative of the particular transmission and the present conditions, the open loop control of future events becomes better. This minimizes the error that the closed loop terms need to accommodate.

Both closed loop control and adaptive control require measurement or estimation of the properties that define the desired behavior. Ideally, this would be accomplished by having a separate sensor for each property. Unfortunately, sensors add cost and weight to a design and introduce failure modes. Also, some parameters are difficult to measure because the sensor would need to be buried in an inaccessible location of the transmission. Consequently, in practice, the number and type of sensors is restricted. When there is no sensor for the property that defines the desired behavior, a model may be utilized to estimate the value based on the available measured properties. These models are subject to the same types of noise factors as the models used to compute the open loop terms. Furthermore, a model may include assumptions that make it valid only under certain operating conditions, such as when in 2nd gear. In order to estimate the property in all of the relevant operating conditions, the controller may need to use multiple models. In some operating conditions, more than one of the models may be valid, leading to possibly conflicting estimates. In such cases, the controller must determine which estimate to trust. The controller may use the trusted model to revise the other models in order to improve the estimate in operating conditions in which the trusted model is unusable.

A number of models will be discussed with reference to a particular transmission layout. Methods of utilizing these models to estimate unmeasured parameters are discussed with reference to a particular collection of available sensor readings. Finally, methods of adapting the models are discussed. Although the discussion references a particular transmission layout and sensor array, a person of skill in the art may apply the methods discussed to different transmission layouts and sensor arrays.

Figure 1:
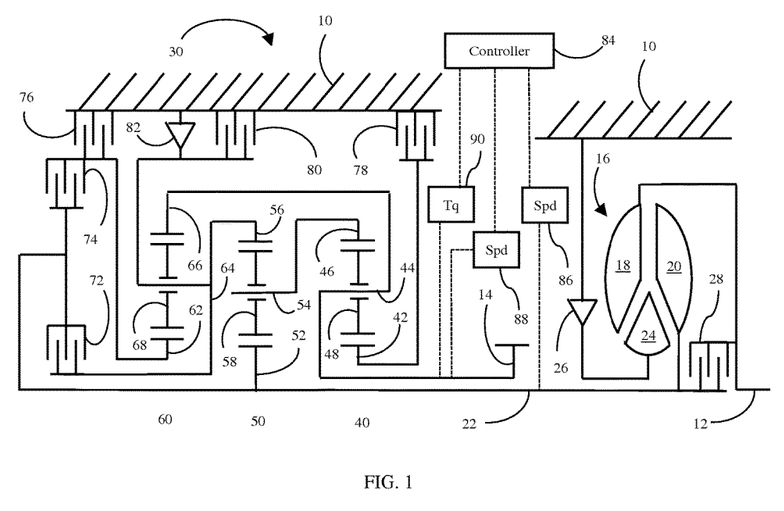
FIG. 1 is a schematic representation of a transmission.

FIG. 1 illustrates a representative front wheel drive automatic transmission. The transmission is contained in a housing 10 that is fixed to vehicle structure. An input shaft 12 is driven by the vehicle engine. The input shaft may be connected to the engine via a damper that isolates the transmission from engine torque pulsations. An output element 14 drives vehicle wheels. The output element 14 may be driveably connected to the wheels via final drive gearing and a differential. The final drive gearing transmits the power to a parallel axis and multiplies the torque by a fixed final drive ratio. The final drive gearing may include layshaft gears, a chain and sprockets, and/or planetary gearing. The differential divides the power between left and right front wheels while permitting slight speed differences as the vehicle turns. Some vehicles may include a power take-off unit that transfers power to rear wheels.

A torque converter 16 has an impeller 18 fixed to input shaft 12 and a turbine 20 fixed to turbine shaft 22. Torque converter 16 transmits torque from input shaft 12 to turbine shaft 22 while permitting turbine shaft 22 to rotate slower than input shaft 12. When turbine shaft 22 rotates substantially slower than input shaft 12, a torque converter stator 24 is held against rotation by one way clutch 26 such that the torque applied to turbine shaft 22 is a multiple of the torque supplied at input shaft 12. When the speed of turbine shaft 22 approaches the speed of input shaft 12, one way clutch 26 overruns. Torque converter 16 also includes a lock-up clutch 28 that selectively couples input shaft 12 to turbine shaft 22.

Gear box 30 establishes a number of speed ratios between turbine shaft 22 and output element 14. Specifically, gear box 30 has three planetary gear sets and five shift elements that establish six forward and one reverse speed ratio. Simple planetary gear sets 40, 50, and 60 each have a sun gear (42, 52, 62), a carrier (44, 54, 64), and a ring gear (46, 56, 66) that rotate about a common axis. Each planetary gear set also includes a number of planet gears (48, 58, 68) that rotate with respect to the carrier and mesh with both the sun gear and the ring gear. Carrier 44 is fixedly coupled to ring gear 66 and output element 14, carrier 54 is fixedly coupled to ring gear 46, ring gear 56 is fixedly coupled to carrier 64, and sun gear 52 is fixedly coupled to turbine shaft 22.

The various speed ratios are established by engaging various combinations of shift elements. A shift element that selectively holds a gear element against rotation may be called a brake whereas a shift element that selectively couples two rotating elements to one another may be called a clutch. Clutches 72 and 74 selectively couple turbine shaft 22 to carrier 64 and sun gear 62, respectively. Brakes 76 and 78 selectively hold sun gear 62 and sun gear 42, respectively, against rotation. Brake 80 selectively holds carrier 64 against rotation. Finally, one way clutch 82 passively holds carrier 64 against rotation in one direction while allowing rotation in the opposite direction. Table 1 illustrates which shift elements are engaged to establish each speed ratio.

TABLE 1

|  | 72 | 74 | 76 | 78 | 80/82 | Ratio | Step |
|---|---|---|---|---|---|---|---|
| Reverse |  | X |  |  | X | −3.00 | 71% |
| 1st |  |  |  | X | X | 4.20 |  |
| 2nd |  |  | X | X |  | 2.70 | 1.56 |
| 3rd |  | X |  | X |  | 1.80 | 1.50 |
| 4th | X |  |  | X |  | 1.40 | 1.29 |
| 5th | X | X |  |  |  | 1.00 | 1.40 |
| 6th | X |  | X |  |  | 0.75 | 1.33 |

Shift elements 72-80 may be hydraulically actuated multi-plate wet friction clutches or brakes. Controller 84 controls the pressure of transmission fluid routed to each shift element. This controller may adjust an electrical current to one or more variable force solenoids to control the pressure supplied to each clutch. When pressurized fluid is first supplied to a shift element, it moves a piston into a stroked position. Then, the piston forces the plates together causing the shift element to transmit torque. The torque capacity is negligible until the piston reaches the stroked position. Once the piston reaches the stroked position, the torque capacity increases approximately linearly with the fluid pressure. When the pressure is relieved, a return spring moves the piston to a released (not stroked) position. The controller receives signals from a turbine speed sensor 86, an output speed sensor 88, and an output torque sensor 90.

In order to estimate the speeds of particular elements and the torques on particular elements to the values measured by sensors 86-90, models are needed. Such models may be derived based on the speed and torque relationships of each of the components disregarding any parasitic power losses. If a group of components that are fixed coupled to one another is modeled as a rigid element, then the sum of the torques exerted on that group, called a shaft, is proportional to the rotational acceleration of the shaft. The coefficient of proportionality is called the rotational moment of inertia, J, which can be estimated based on the dimensions and material density or can be measured experimentally.

$$\Sigma\tau = J\alpha$$

Gearbox 30 of FIG. 1 has 6 such shafts: turbine shaft 22 and sun 52; sun 42; output 14, carrier 44, and ring 66; carrier 54 and ring 46; carrier 64 and ring 56; and sun 62.

Disregarding parasitic losses, the speeds of the elements of a planetary gear set and their relative torques are related to the number of teeth on the sun gear, $N_{sun}$, and the number of teeth on the ring gear, $N_{ring}$. Specifically, for a simple planetary gear set, $$N_{sun}\omega_{sun} + N_{ring}\omega_{ring} = (N_{sun} + N_{ring})\omega_{carrier}$$

$$N_{ring}\tau_{sun} = N_{sun}\tau_{ring}$$

$$\tau_{sun} + \tau_{carrier} + \tau_{ring} = 0$$

For a double-pinion planetary gear set, $$N_{ring}\omega_{ring} - N_{sun}\omega_{sun} = (N_{ring} - N_{sun})\omega_{carrier}$$

$$N_{ring}\tau_{sun} = -N_{sun}\tau_{ring}$$

$$\tau_{sun} + \tau_{carrier} + \tau_{ring} = 0$$

A friction clutch selectively couples two elements, called the hub and the shell. In the examples herein, the top edge of the clutch symbol in FIG. 1 will be treated as the shell and the bottom edge of the symbol will be treated as the hub, although the choice is arbitrary. The torques applied to each element are a function of the clutch torque capacity, $\tau_{cap}$, and relative speeds of the elements. Specifically, $$\begin{cases} \tau_{hub} = \tau_{cap} \text{ if } \omega_{hub} < \omega_{shell} \\ \text{abs}(\tau_{hub}) \leq \tau_{cap} \text{ if } \omega_{hub} = \omega_{shell} \\ \tau_{hub} = -\tau_{cap} \text{ if } \omega_{hub} > \omega_{shell} \end{cases}$$

$$\tau_{hub} + \tau_{shell} = 0$$

Disregarding parasitic losses, the torque capacity of a released clutch is zero.

For gearbox 30 in FIG. 1, each of the three planetary gear sets provide one equation relating the speeds of the six shafts. When the gearbox is engaged in a particular gear ratio (not shifting), the two engaged clutches each provide one equation relating the speeds of the shafts. With six shafts and five equations, we must have one measured speed in order to be able to calculate all of the speeds. This additional speed could be provided by turbine speed sensor 86 or by output speed sensor 88. For example when third gear is engaged (clutch 74 and brake 78 engaged), the speeds of the six shafts can be determined by simultaneously solving the six equations:

$$N_{42}\omega_{42} + N_{46}\omega_{46,54} = (N_{42} + N_{46})\omega_{14,44,66} \text{ (from gear set 40)}$$

$$N_{52}\omega_{22,52} + N_{56}\omega_{56,64} = (N_{52} + N_{56})\omega_{46,54} \text{ (from gear set 50)}$$

$$N_{62}\omega_{62} + N_{66}\omega_{14,44,66} = (N_{62} + N_{66})\omega_{56,64} \text{ (from gear set 60)}$$

$$\omega_{22,52} = \omega_{62} \text{ (from clutch 74 being engaged)}$$

$$\omega_{42} = 0 \text{ (from brake 78 being engaged)}$$

$$\omega_{14,44,66} = \text{measured}$$

The second speed sensor may be used to confirm that third gear is in fact engaged. Each speed is proportional to the measured speed. The equations can be solved in advance to find the coefficient of proportionality for each shaft for each gear ratio.

For gearbox 30, there are 21 element torques to be calculated, three for each planetary gear set, two for each clutch, plus the input torque and the output torque. Each of the three planetary gear sets provides two torque equations. Each of the five shift elements provides one torque equation. Each of the six shafts provides one torque equation. (By convention, output torque is defined as the torque exerted by the gearbox on the output, whereas other torques are defined as the torque exerted by the component on the shaft. Therefore, output torque appears on the opposite side of the shaft torque equation from component torques.) Each shaft equation requires the shaft acceleration which is determined by numerically differentiating the shaft speed. Collectively, this provides 17 torque equations. When the gearbox is engaged in a particular gear ratio, the three disengaged clutches each provide an additional torque equation. Therefore, one sensed torque is required, which is provided by torque sensor 90. For example when third gear is engaged, the torques can be determined by simultaneously solving the 21 equations:

$$N_{46}\tau_{42} = N_{42}\tau_{46}$$

$$\tau_{42} + \tau_{44} + \tau_{46} = 0$$

$$N_{56}\tau_{52} = N_{52}\tau_{56}$$

$$\tau_{52} + \tau_{54} + \tau_{56} = 0$$

$$N_{66}\tau_{62} = N_{62}\tau_{66}$$

$$\tau_{62} + \tau_{64} + \tau_{66} = 0$$

$$\tau_{hub\ 72} + \tau_{shell\ 72} = 0$$

$$\tau_{hub\ 74} + \tau_{shell\ 74} = 0$$

$$\tau_{hub\ 76} + \tau_{shell\ 76} = 0$$

$$\tau_{hub\ 78} + \tau_{shell\ 78} = 0$$

$$\tau_{hub\ 80} + \tau_{shell\ 80} = 0$$

$$\tau_{input} + \tau_{22} + \tau_{shell\ 72} + \tau_{hub\ 74} = J_{22,52}\alpha_{22,52}$$

$$\tau_{42} + \tau_{hub\ 78} = J_{42}\alpha_{42}$$

$$\tau_{44} + \tau_{66} = \tau_{output} + J_{14,44,66}\alpha_{14,44,66}$$

$$\tau_{46} + \tau_{54} = J_{46,54}\alpha_{46,54}$$

$$\tau_{56} + \tau_{64} + \tau_{hub\ 72} + \tau_{hub\ 80} = J_{56,64}\alpha_{56,64}$$

$$\tau_{62} + \tau_{shell\ 74} + \tau_{hub\ 76} = J_{62}\alpha_{62}$$

$$\tau_{hub\ 72} = 0 \text{ (from clutch 72 being disengaged)}$$

$$\tau_{hub\ 76} = 0 \text{ (from brake 76 being disengaged)}$$

$$\tau_{hub\ 80} = 0 \text{ (from brake 80 being disengaged)}$$

$$\tau_{output} = \text{measured}$$

These equations can be manipulated such that each torque is expressed as a sum of two terms, one term proportional to the measured torque and the other proportional to the measured acceleration. The coefficients of proportionality can be determined in advance for each gear ratio. The hub and shell torque of the applied shift elements, 74 and 78 in this example, indicate a lower limit on the respective shift element torque capacity. However, the actual torque capacity cannot be determined using this model.

The above model disregards parasitic losses. However, the model can be modified to account for some types of parasitic losses. For example, a disengaged shift element does not necessarily have zero torque capacity. This type of parasitic drag can be accounted for in the model by calculating the torque capacity of disengaged clutches as a function of the speeds of the hub and the shell, or as a function of the speed difference. Windage losses can be accounted for by adding a windage term in each shaft torque equation where the windage term is a function of the shaft speed. Mesh efficiency can be accounted for by slightly increasing or decreasing the tooth counts in the equation that relates the sun gear torque to the ring torque. Whether the tooth count is increased or decreased depends on the relative speeds and the direction of the torque. When losses are modeled this way, the individual component torques can still be computed based on a single measured speed and a single measured torque, although it may not be possible to pre-simplify the equations.

An alternative approach to modeling parasitic losses is to model the aggregate losses of the gearbox. The aggregate power loss of the gearbox may be tabulated as a function of the measured speed and measured torque and possible other factors such as fluid temperature. This table may be populated empirically using a dynamometer, using detailed component models, or some combination of the two. One disadvantage of using an aggregate loss model is that it is not as amenable to calculating individual component torques as a detailed component by component loss model.

During a shift between ratios, the calculations of component torque must be modified. A typical upshift includes three phases: a preparatory phase, a torque transfer phase, and an inertia phase. During the preparatory phase, pressure is commanded to the on-coming shift element in order to stroke the piston so that it is ready for engagement. Also, the torque capacity of the off-going shift element may be reduced from a holding capacity well in excess of the transmitted torque to a value close to the actual transmitted torque. During the torque transfer phase, the torque capacity of the off-going shift element is gradually reduced and the torque capacity of the on-coming shift element is gradually increased. During this phase, there is little or no slip across the off-going shift element but considerable slip across the on-coming shift element. When the off-going shift element torque capacity reaches zero, the power flow path associated with the upshifted gear is established. Therefore, the torque ratio is equal to the upshifted torque ratio. However, the speed ratio is still equal or nearly equal to the original speed ratio. When the off-going shift element is completely released, the torque transfer phase ends and the inertia phase begins. During the inertia phase, the torque capacity of the on-coming shift element is controlled to eliminate the slip across the on-coming shift element and bring the speed ratio to the upshifted speed ratio in a controlled manner.

A downshift also includes an inertia phase and a torque transfer phase, although they occur in the opposite order. During the inertia phase, the torque capacity of the off-going shift element is controlled to bring the speed ratio to the downshifted speed ratio in a controlled manner, which involves a progressively increasing slip across the off-going shift element. The on-coming shift element may be prepared for engagement by commanding pressure in order to stroke the piston. During the inertia phase, the torque capacity of the on-coming shift element is gradually increased while the torque capacity of the off-going element is reduced to zero.

During the shift, neither the on-coming nor the off-going shift element can be assumed to have zero slip. Although it may be intended for the off-going shift element to have zero slip during the torque phase of an upshift and for the on-coming shift element to have zero slip during the torque phase of a downshift, the controller cannot assume this to be the case. Therefore, one of the component speed equations that is used when the transmission is in a fixed gear is not available during the shift. Consequently, both speed sensors 86 and 88 contribute speed equations. In some shifts, more than one clutch is released and more than one clutch is engaged. In such shifts, more than two shafts speeds must be determined with sensors.

Similarly, during the shift, neither the on-coming nor the off-going shift element can be assumed to have zero torque capacity. Although it may be intended for the on-coming shift element to have zero torque capacity during the preparatory phase of an upshift and during the inertia phase of a downshift, the controller cannot assume this to be the case. Sometimes, the pressure intended to merely stroke the piston actually causes a torque capacity increase. Therefore, one of the component torque equations that is used when the transmission is in a fixed gear is not available during the shift. If the transmission is not equipped with a second torque sensor, then a model may be used to estimate the input torque to provide the additional component torque equation.

$$\tau_{input} = \tau_{turbine} + \tau_{hub\ 28}$$

When torque converter lock-up clutch 28 is disengaged, the torque at the hub of lock-up clutch 28 is zero. Therefore, a model of the torque converter can provide the additional torque estimate needed during shifting. For a particular torque converter geometry (diameter, blade angles, etc), the hydro-dynamic torques exerted on the torque converter elements are functions of the turbine speed and the impeller speed. Environmental factors, such as fluid temperature, may also impact the relationship to some degree. A suitable torque converter model is described in U.S. Patent Publication 2013/0345022 which is hereby incorporated by reference herein. Specifically, $$\tau_{impeller} = f1(\omega_{impeller}/\omega_{turbine}, temp, \ldots)\omega_{impeller}^2$$

$$\tau_{turbine} = f2(\omega_{impeller}/\omega_{turbine}, temp, \ldots)\omega_{impeller}^2$$

$$\tau_{turbine} + \tau_{impeller} + \tau_{stator} = 0$$

The functions f1 and f2 can be determined experimentally and stored by the controller as tables. The turbine speed is directly measured using sensor 86. The impeller speed is equal to the engine crankshaft speed and can be obtained using a third speed sensor or by communication with an engine controller.

When lock-up clutch 28 is engaged, on the other hand, a model of the engine torque can provide the additional torque estimate needed during shifting. The transmission controller may obtain the current engine torque estimate by requesting it from the engine controller which maintains an engine torque model. Specifically, $$\tau_{engine} + \tau_{impeller} + \tau_{shell\ 28} = j_{12}\alpha_{12}$$

When lock-up clutch 28 is fully engaged, the impeller torque is zero. When the lock-up clutch is slipping, the hydro-dynamic model above may be used to estimate the impeller torque.

During the shift, accurate control of torque capacity is important in order to achieve a smooth shift. For example, during the torque transfer phase, the increase in torque capacity of the on-coming shift element must be carefully coordinated with the decrease in torque capacity of the off-going shift element. If the torque capacity of the on-coming shift element is ramped up too slowly, relative to the input torque and the rate of decrease of off-going shift element torque capacity, then an engine flare occurs. If, on the other hand, the on-coming shift element torque is ramped up too quickly, then a tie-up condition occurs. Both result in an excessive decrease in output torque.

Open loop control of shifts is aided by having a model for each shift element. The torque capacity of each clutch is adjusted by adjusting an electrical current to a solenoid in the valve body. A valve in the valve body responds by adjusting the pressure in a fluid circuit in proportion to the force generated by the solenoid. The fluid is routed to a clutch apply chamber where it pushes a piston to compress a clutch pack with interleaved friction plates and separator plates. A return spring forces the piston back when the pressure is relieved. In an exemplary steady state model of a hydraulically actuated friction clutch or brake, the torque capacity is a function of the electrical current supplied. This function generally has two segments. In a first segment, from zero current up to the current required to overcome the force of the return spring, the torque capacity is zero. Beyond the current required to overcome the return spring, the torque capacity increases linearly with respect to the current. In an alternative model, the fluid pressure is a function of the electrical current and the torque capacity is a function of the fluid pressure. This alternative model may be useful if a pressure sensor is available to provide a pressure feedback signal. In some models, other factors such as temperature may be considered. A dynamic model of the hydraulically actuated shift element may account for the time delay while the piston moves from the released position to the stroked position.

At each time step, the controller determines a desired torque capacity for each shift element and then determines what electric current to command to the corresponding solenoid using the shift element model. This open loop control method, however, is subject to inaccuracy due to various noise factors. When a torque capacity estimate based on a measurement is available, the inaccuracies can be reduced using closed loop terms. When a clutch is slipping, such as the on-coming element in an upshift torque phase or the off-going element in a downshift torque phase, the gearbox model described above provides such an estimate. Furthermore, the estimated torque capacity can be used to adaptively revise the shift element model. Consequently, control is improved even when the shift element is not slipping, such as the off-going element in an upshift or the on-coming element in a downshift.

When the transmission is in a fixed gear ratio, there are multiple models which predict gearbox input torque. This may provide an opportunity to adaptively refine one or both models. One estimate is produced by the gearbox model in combination with a torque sensor reading and a speed sensor reading. This model may include component parasitic loss models or an aggregate parasitic loss model. When lock-up clutch 28 is fully engaged, a second gearbox input torque estimate is based on an engine model. The engine model may be based on engine operating parameters such as throttle setting, spark timing, engine speed, etc. Engine models tend to be susceptible to noise factors such as environmental conditions that are not accounted for, wear, and part to part variability. Similarly, when lock-up clutch 28 is disengaged, a second gearbox input torque estimate is based on a torque converter model. If the estimates differ, the torque converter model, the aggregate gearbox loss model, or both may be modified to bring the estimates closer together.

Several of the models described above can be represented in controller 84 as one or more lookup tables. A lookup table stores predicted values of a model output variable for various combinations of values of one or more model input variables. When there is only one input variable, the lookup table is referred to as one dimensional. For example, a one dimensional lookup table may be used to represent the clutch transfer function model by storing values of clutch torque capacity at various commanded pressures. When the output variable is dependent upon multiple input variables, higher dimensional lookup tables are used. For example, the aggregate gearbox loss model for 3rd gear may be represented as a three dimensional lookup table based on gearbox input torque, gearbox input speed, and temperature. If the model includes multiple output variables, it may be represented by multiple lookup tables. For example, the torque converter model may have one lookup table for impeller torque and another lookup table for turbine torque.

To find a value for a model output variable based on particular values of the model input variables, the controller finds the stored points that are closest to the particular values and then interpolates. For example, to find the predicted gearbox losses at 1200 rpm input speed and 75 Nm input torque, the controller may interpolate between the stored loss values at (1000 rpm, 70 Nm), (1500 rpm, 70 Nm), (1000 rpm, 80 Nm), and (1500 rpm, 80 Nm). To find an input variable corresponding to a desired output variable, reverse interpolation is used. For example, to find the open loop pressure command for a desired clutch torque capacity of 95 Nm, the controller may interpolate between a stored point that yields 92 Nm and a stored point that yields 96 Nm. This reverse interpolation yields a unique solution only when the underlying function is monotonic. Alternatively, the model may be re-formulated such that torque capacity is an input variable and commanded pressure is an output variable.

Several methods are known for adaptively updating a model represented as a lookup function. These include both stochastic adaptation methods and periodic adaptation methods. Stochastic adaptation methods update the values in the lookup table in response to individual observed results. One such method is described in European Patent Application EP 1 712 767 A1, which is incorporated by reference herein. When the observed result differs from the value estimated by the lookup table, the stored values for nearby values of the model input variables are modified such that a new prediction for the same model input values is closer to the observed result. In the example above, stored gearbox loss estimates at (1000 rpm, 70 Nm), (1500 rpm, 70 Nm), (1000 rpm, 80 Nm), and (1500 rpm, 80 Nm) were used to predict gearbox losses at 1200 rpm input speed and 75 Nm input torque. If the interpolation yields an estimate of 1.5 Nm of loss and the observed loss is 2.5 Nm, those four stored values might each be increased by 0.2 Nm such that a new estimate at the same operating point would be 1.7 Nm. For stability, the adaptation is not allowed to change the stored values by too much at once. The adaptation may be restricted in various ways. For example, adaptation may only be allowed when the operating point is sufficiently close to one of the stored values. In this example, adaptation may not be performed for the observation at 1200 rpm and 75 Nm but may be allowed for operating points within 100 rpm at 2 Nm of one of the stored values. Also, there may be pre-defined bounds outside of which adaptation is not performed. For example, in the gearbox loss model, stored values may not be permitted to become negative since actual losses would never be negative. In a periodic adaptation method, multiple observations are stored and then a curve fitting process is performed to calculate new values for model parameters. As with stochastic adaptation methods, there may be restrictions on the rate of adaptation and there may be boundaries beyond which adaptation is not permitted.

During operation of a transmission, there are several operating conditions in which more than one model is available to predict a particular parameter. In such a circumstance, the controller may select one of the estimates as the trusted value. This selection may be based on a priori information about which model tends to be more accurate. The selection may also be based on other criteria such as when the inputs to one model are relatively constant and the inputs to the other model are changing rapidly making the former model more trustworthy. The controller may utilize the trusted value to adapt the less trusted model, making the less trusted model more trustworthy in other circumstances. Alternatively, the controller may select a value that is a weighted average of the multiple estimates, with weighting factors based on the degree of trust of each model. In that case, both models may be subject to adaptation to bring the estimates closer to the selected value. This approach is most useful if each model is also adapted in other circumstances based on independent models. If one model is correct and the other model is inaccurate, the correct model will be re-adapted toward its original prediction in those other circumstances.

Figure 2:
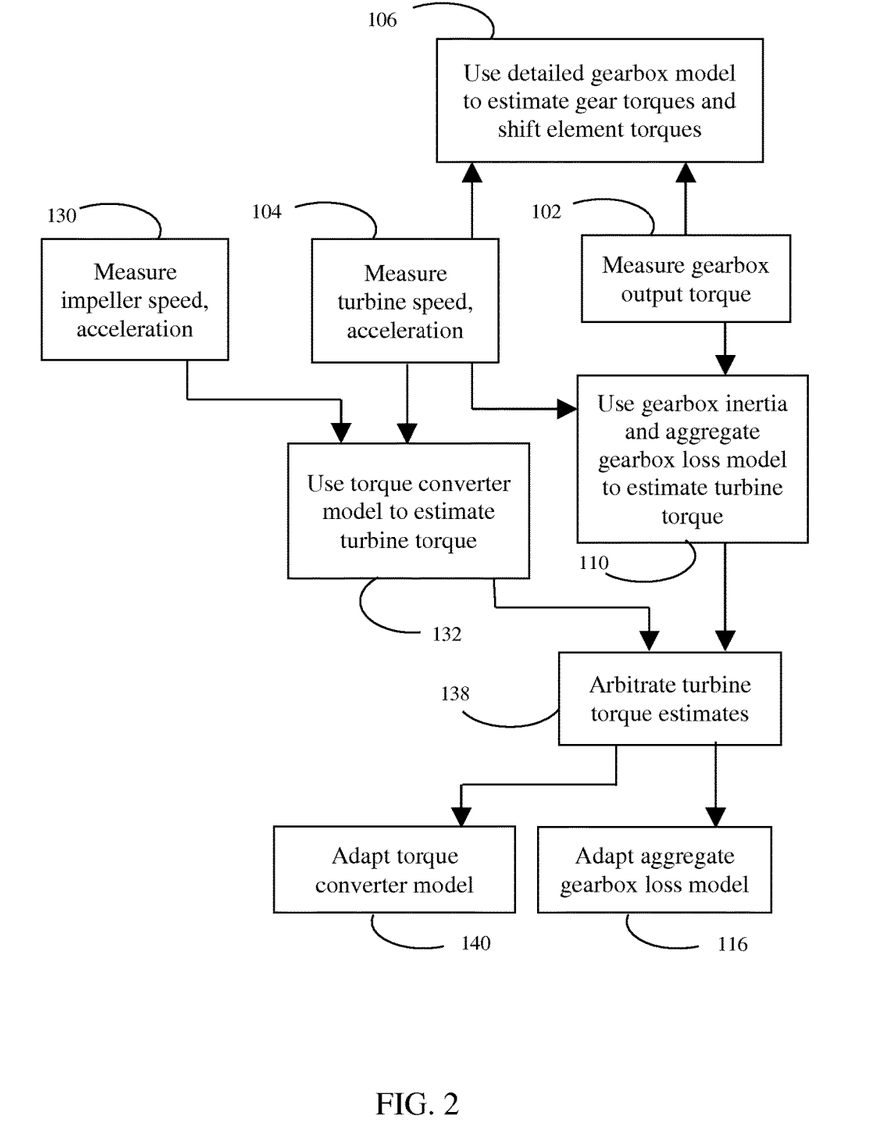
FIG. 2 is a flow chart for estimating component torques while operating a transmission in a fixed gear ratio.

FIG. 2 illustrates a process for operating a transmission, such as the transmission of FIG. 1, when the torque converter lockup clutch is fully disengaged and the transmission is to remain in the current gear ratio. This process is repeated at regular intervals while the transmission remains in this condition. The gearbox output torque is measured at 102 using torque sensor 90, for example. The turbine speed is measured at 104 using speed sensor 86, for example. The acceleration rate of the turbine may be determined by numerically differentiating the turbine speed signal or may be measured by a separate sensor. Impeller speed and acceleration are measured at 130. Since the impeller speed and the engine speed are equal, an engine speed sensor could be used instead of an impeller speed sensor. At 106, a detailed gearbox model is used to estimate the torques of each transmission component of interest, such as gears and shift elements. These torques are proportional to the gearbox output torque measured at 102 corrected for parasitic losses, which may be based on the speed measured at 104, and inertia effects based on the acceleration measured at 104. A turbine torque estimate is generated at 110 based on measured gearbox output torque, turbine speed, and turbine acceleration, using an aggregate gearbox loss model. At 132, a torque converter model is used with the measured impeller speed and measured turbine speed to estimate the turbine torque. Since there are two estimates of turbine torque, arbitration is performed at 138 to select a value. The selected value may be used to adapt the torque converter model and aggregate gearbox loss model at 140 and 116 respectively.

Figure 3:
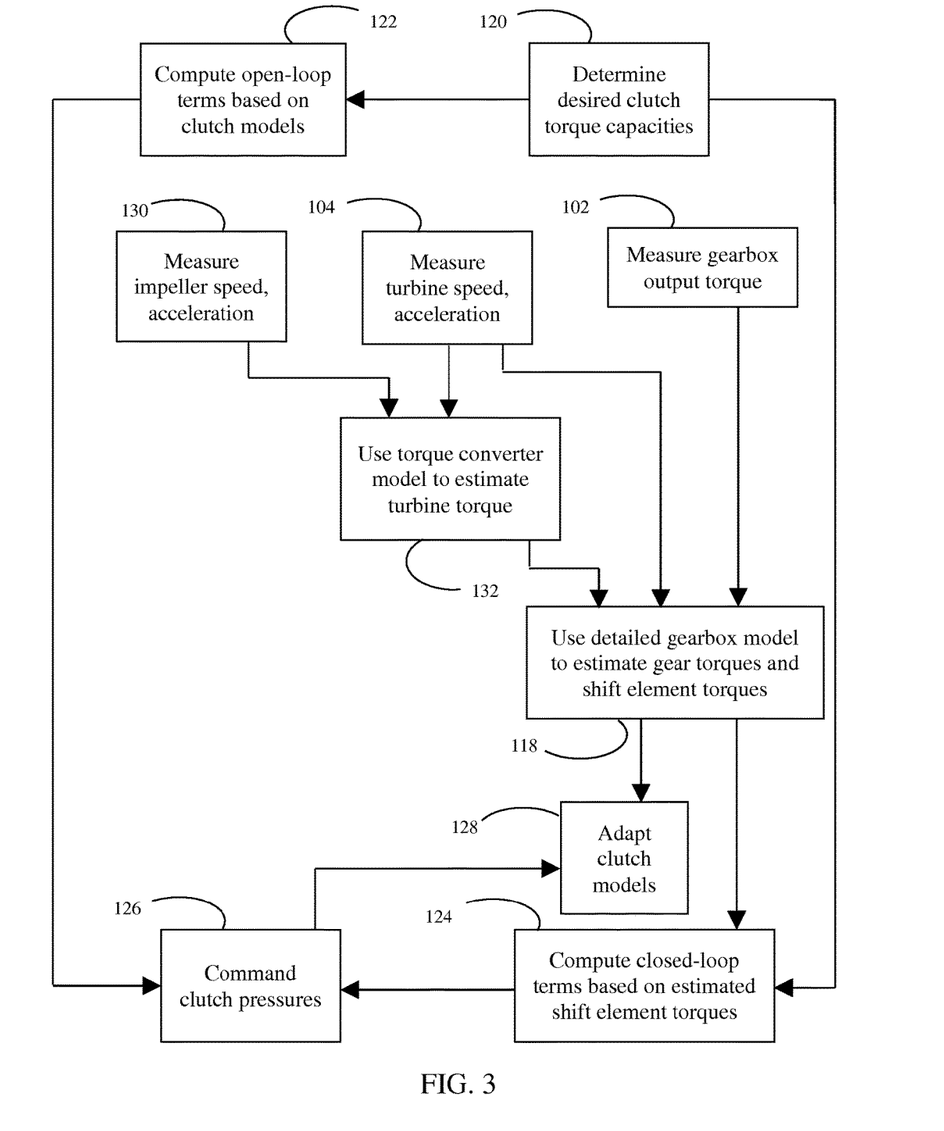
FIG. 3 is a flow chart for estimating component torques while shifting a transmission.

FIG. 3 illustrates a process for operating the transmission during a shift when the torque converter lockup clutch is fully disengaged. This process is repeated at regular intervals during the shift. Steps that are common with FIG. 2 use the same reference number. At 118, the detailed gearbox model is used to estimate the torques of each transmission component of interest, such as gears and shift elements. During the shift, the detailed gearbox model requires two input torque values, so both the measured torque from 102 and the estimated turbine torque from 132 are utilized. The desired clutch torque capacities, as required to generate the desired shift feel, are computed at 120. At 122, a clutch model for each clutch is used to calculate the pressure required to produce the desired torque, which is used as an open loop term for clutch pressure control. At 124, the difference between the desired clutch torque capacity and the corresponding estimates from 118 is used to compute closed loop terms. At 126, the control commands a pressure equal to the sum of the open loop term and the closed loop terms. At 128, the commanded pressure from 126 and the estimated shift element torque from 118 may be used to adapt the clutch models, such that future shifts are improved due to reduced reliance on closed loop feedback.

Transmission components that transmit torque such as shafts, gears, clutches, etc. each have a maximum amount of torque which they can transfer. In the case of a friction clutch, attempting to transmit more than the maximum torque results in the clutch slipping. In the case of gears, shafts, and one-way clutches, subjecting the component to more than the maximum torque may result in immediate component failure or accelerated degradation and eventual failure. Ideally, the transmission components would be designed to transmit the maximum torque that the engine is capable of producing in all operating conditions. However, this is often not feasible. The relationship between engine torque and component torque may differ significantly among gear ratios. For example, in reverse, a particular gear may transmit three times the turbine torque, which itself may be two times the engine torque. To accommodate this condition, the gear would need to be designed to handle six times the maximum engine torque. However, the vehicle wheels would usually lose traction at that level of torque, so it is unlikely to occur in practice except in very rare circumstances such as when the wheels are frozen in mud. Designing the gear to withstand that much torque would increase cost and weight and reduce the efficiency in other operating conditions. As another example, the transmission may initially be designed to work with an engine that produces a maximum of 200 Nm of torque. Later, the engine may be improved to produce 250 Nm of torque. Modifying the gear may be impractical. The vehicle manufacturer may use the transmission with the improved engine since the transmission can handle 250 Nm in most conditions and the next larger size transmission may be substantially more costly, less efficient, or may not fit in the vehicle. As a third example, a vehicle owner may modify the engine after purchasing the vehicle in order to generate additional power.

Consequently, a transmission manufacturer may determine which component is the weakest link in each operating condition and provide different input torque ratings for different operating conditions. The vehicle manufacturer then limits the engine torque to avoid exceeding the rated capacity for the present operating condition. Specifically, whenever the engine model prediction of engine torque approaches the rated limit for the operating condition, the controller limits the engine torque or shifts to a different operating condition, such as a different gear ratio or torque converter lock-up state. To avoid failures, the transmission manufacturer must set the rated torque capacity to protect each component from circumstances that can increase the component torque above the steady state multiple of engine torque. For example, during the inertia phase of a shift, component torque may be influenced by input inertia. Consequently, the components may actually be capable of transmitting more than the rated input torque capacity in many situations. Additionally, the engine model is subjected to many noise factors that may cause the engine torque estimate to differ from the actual engine torque. To be conservative, the controller may reduce engine torque to a limit lower than the rated torque capacity. For example, if the rated torque capacity in the present operating condition is 200 Nm and the engine torque model is accurate to within 10 Nm, the controller may limit engine torque such that the estimate does not exceed 190 Nm. Sometimes, the engine may actually only be producing 180 Nm in that circumstance.

Figure 4:
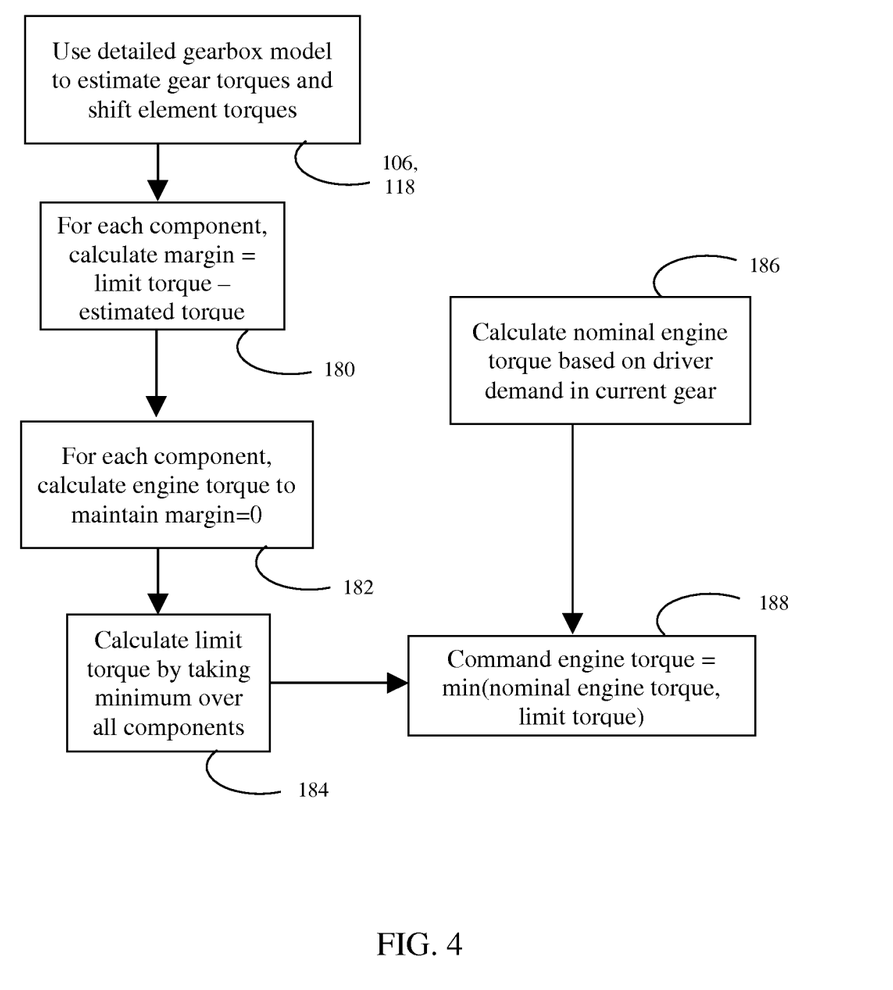
FIG. 4 is a flow chart for setting engine torque based on estimated component torque values to avoid overstressing transmission components.

The processes of FIGS. 2 and 3 provide the ability to compute torque estimates for gears and shift elements within a gearbox based on an output torque sensor, impeller and turbine speed sensors, and a variety of models. The processes also provide the ability to adapt the models such that they accurately represent the current behavior of the system despite part to part variation and component changes over time. FIG. 4 illustrates a process which utilizes the accurate component torque estimates to avoid overstressing transmission components. The process of FIG. 9 starts after the gear and shift element torques are calculated using the detailed gearbox model, which may occur at either 106 or 118 depending on whether the gearbox is in a fixed gear or is shifting. At 180, the controller calculates a margin for each component of interest by subtracting the estimated component torque from a predetermined limit torque for that component. The limit torque is selected to provide some margin of safety against component failure. At 182, for each component, an engine torque is calculated that would maintain the component torque near the predetermined limit. These torques are computed using closed loop terms computed based on the margin (as opposed to being computed based on a measured error). The terms may include proportional, derivative, and integral terms. At 184, the controller calculates a limit torque by taking the minimum of the engine torques computed at 182 over all of the components of interest. At 186, the controller calculates a nominal engine torque based on a driver demanded torque and the current gear ratio. This nominal torque is the torque that would normally be commanded. At 188, the controller commands the engine to deliver either the nominal torque or the limit torque, whichever is less.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of operating a vehicle during a drive cycle comprising:
    repeatedly measuring a transmission output torque;
    repeatedly measuring a transmission input speed;
    repeatedly estimating a torque on a transmission component based on the output torque and input speed measurements; and
    adjusting an engine torque in response to the estimated component torque approaching a predetermined limit value to avoid over-loading the transmission component.

2. The method of claim 1 wherein estimating the torque on the transmission component is also based on a derivative of the transmission input speed.

3. The method of claim 1 further comprising repeatedly measuring a turbine speed and wherein estimating the torque on the transmission component is also based on the turbine speed measurement.

4. The method of claim 1 wherein the transmission component is a gear.

5. A transmission controller comprising:
    communication channels for receiving an output torque signal and a transmission input speed signal and for sending a request to limit an engine torque; and
    control logic programmed to
        estimate a torque on a transmission component based on the output torque and input speed signals, and request a reduction in engine torque in response to the estimated component torque approaching a predetermined limit value to avoid over-loading the transmission component.

6. The controller of claim 5 wherein estimating the torque on the transmission component is also based on a derivative of the transmission input speed.

7. The controller of claim 5 wherein the communications channels further receive a turbine speed signal and wherein control logic is further programmed to utilize the turbine speed to estimating the torque on the transmission component.

8. The controller of claim 5 wherein the transmission component is a gear.

* * * * *